United States Patent
Araki et al.

(10) Patent No.: US 7,603,225 B2
(45) Date of Patent: Oct. 13, 2009

(54) COMBUSTION CONTROL OF INTERNAL COMBUSTION ENGINE

(75) Inventors: Takashi Araki, Chigasaki (JP); Toru Noda, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/173,491

(22) Filed: Jul. 15, 2008

(65) Prior Publication Data

US 2009/0037077 A1 Feb. 5, 2009

(30) Foreign Application Priority Data

Aug. 3, 2007 (JP) ............... 2007-203342

(51) Int. Cl.
*F02D 45/00* (2006.01)
*F02D 19/08* (2006.01)

(52) U.S. Cl. ...................... 701/104; 123/435

(58) Field of Classification Search ......... 701/103–105; 123/305, 295, 435
See application file for complete search history.

(56) References Cited

U.S. PATENT DOCUMENTS 6,651,617 B2 * 11/2003 Sukegawa et al. .......... 701/105
6,651,677 B2 * 11/2003 Sukegawa et al. .......... 701/105
7,272,487 B2 * 9/2007 Christen et al. ............ 123/435

FOREIGN PATENT DOCUMENTS

JP 2004-197660 A 7/2004
JP 2008-106737 A * 5/2008

* cited by examiner

*Primary Examiner*—Hieu T Vo
(74) *Attorney, Agent, or Firm*—Foley & Lardner LLP

(57) ABSTRACT

A controller (70) controls combustion in an internal combustion engine that injects a fuel having high self-ignitability into a cylinder during a compression stroke, in which a premixed gas formed from a fuel having low self-ignitability is compressed within the cylinder, and ignites the premixed gas using the injected fuel as an ignition source. The controller (70) is programmed to detect any one of a self-ignitability of the fuel forming the premixed gas, a self-ignitability of the fuel serving as the ignition source, and an internal cylinder pressure, and set the other two in accordance with a resulting detection value. Thus, combustion conditions can be controlled appropriately, regardless of the engine operating conditions.

16 Claims, 18 Drawing Sheets

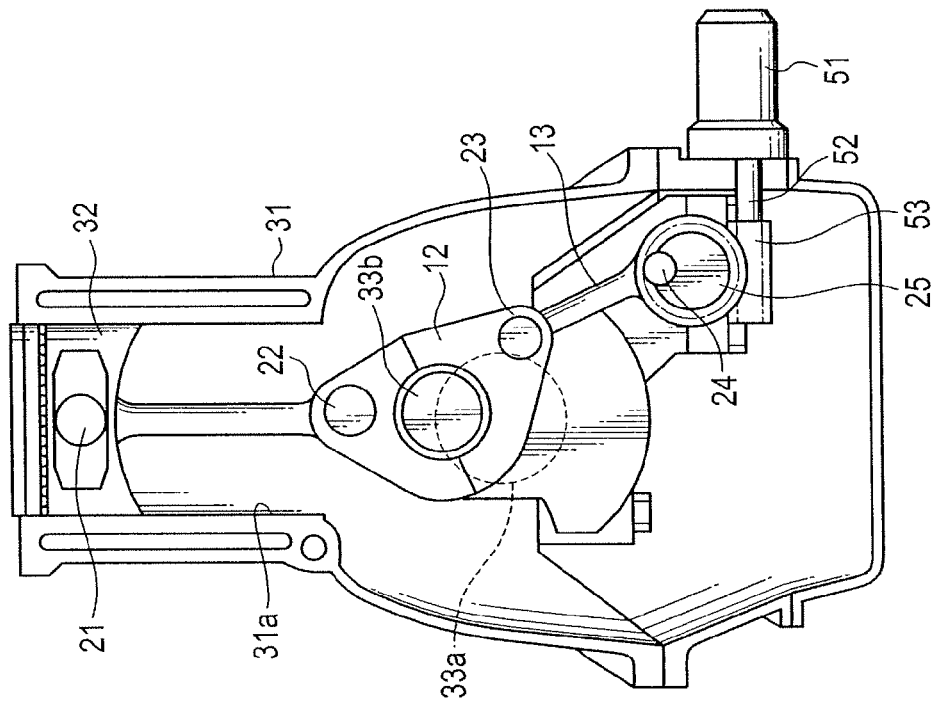
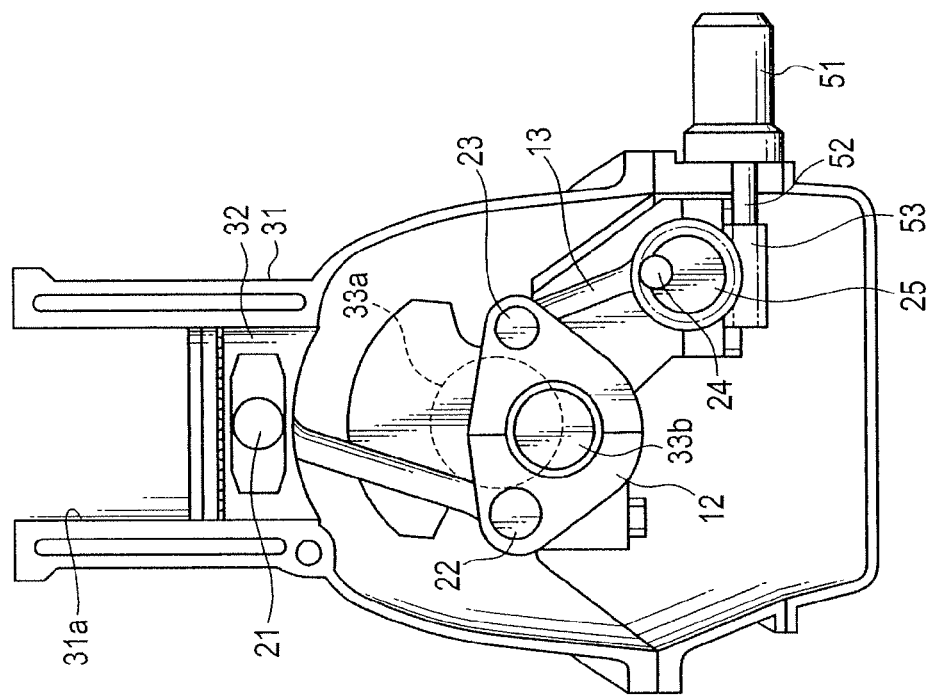

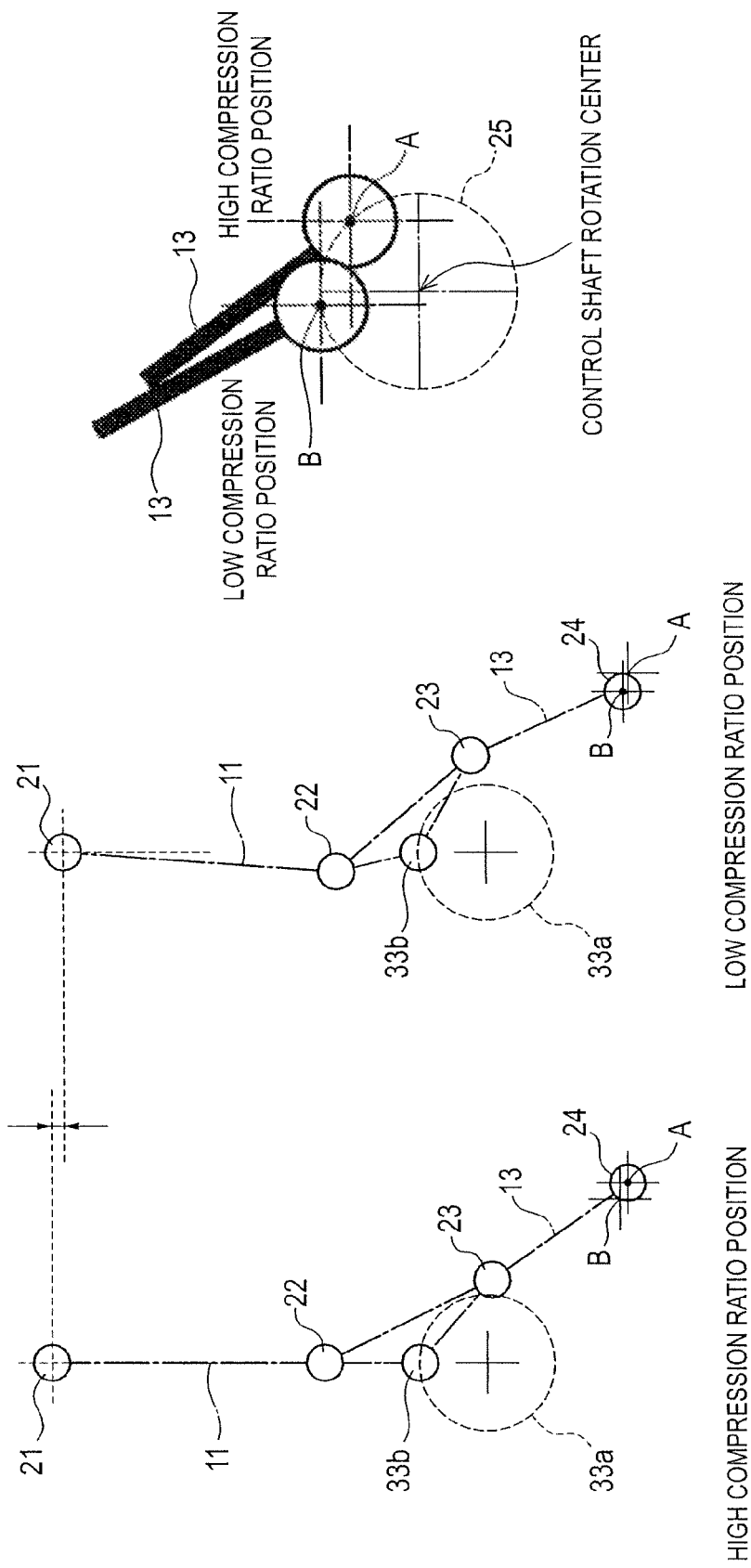

COMBUSTION CONTROL OF INTERNAL COMBUSTION ENGINE

FIELD OF THE INVENTION

This invention relates to combustion control in an internal combustion engine.

BACKGROUND OF THE INVENTION

JP2004-197660A, published by the Japan Patent Office in 2004, discloses a Homogeneous Charge Compression Ignition (to be abbreviated to HCCI hereafter) internal combustion engine comprising a first fuel injector and a second fuel injector. The first fuel injector injects fuel having a high octane value and low self-ignitability into an intake port. The injected low self-ignitability fuel is aspirated into a cylinder together with intake air to form a low self-ignitability premixed gas. The second fuel injector injects a fuel having a low octane value and high self-ignitability into the cylinder in radial fashion during a compression stroke. The injected high self-ignitability fuel is dotted through the interior of the cylinder in atomized masses, and is caused to self-ignite by compression heat. The resulting self-ignited flames propagate from a plurality of locations in the cylinder so as to burn the low self-ignitability fuel. As a result, the combustion speed increases, and combustion is completed before knocking occurs.

SUMMARY OF THE INVENTION

Incidentally, JP2004-197660A supposes that the self-ignitability of the fuel that is injected into an intake port and the self-ignitability of a fuel that is injected into a cylinder are constant. Therefore, when the self-ignitability of a fuel that is injected into an intake port and the self-ignitability of a fuel that is injected into a cylinder are changed, the combustion conditions of an engine could not be controlled appropriately.

It is therefore an object of this invention to control the combustion conditions of an engine appropriately, regardless of the operating conditions of the engine, by detecting one of the self-ignitability of a fuel that is injected into an intake port, the self-ignitability of a fuel that is injected into a cylinder, and an internal cylinder pressure in the vicinity of compression top dead center, and controlling the remaining two in accordance with the resulting detection value.

In order to achieve the above object, this invention provides a combustion control device for an internal combustion engine which, during a compression stroke in which a premixed gas containing a fuel and air is compressed within a cylinder after being aspirated into the cylinder, injects a fuel having a higher self-ignitability than the fuel forming the premixed gas into the cylinder, and ignites the premixed gas using the injected fuel as an ignition source. The device comprises a programmable controller programmed to detect any one of the self-ignitability of the fuel forming the premixed gas, the self-ignitability of the fuel serving as the ignition source, and an internal cylinder pressure in the vicinity of compression top dead center, and adjust the other two in accordance with a resulting detection value.

This invention also provides a combustion control method for an internal combustion engine which, during a compression stroke in which a premixed gas containing a fuel and air is compressed within a cylinder after being aspirated into the cylinder, injects a fuel having a higher self-ignitability than the fuel forming the premixed gas into the cylinder, and ignites the premixed gas using the injected fuel as an ignition source. The method comprises detecting any one of the self-ignitability of the fuel forming the premixed gas, the self-ignitability of the fuel serving as the ignition source, and an internal cylinder pressure, and adjusting the other two in accordance with a resulting detection value.

The details as well as other features and advantages of this invention are set forth in the remainder of the specification and are shown in the accompanying drawings.

BRIEF DESCRIPTION OF THE DRAWINGS

FIGS. 4A-4B are schematic longitudinal cross-sectional views illustrating an operation of the VCR engine.

FIGS. 5A-5C are diagrams illustrating link attitudes after modifying a mechanical compression ratio of the VCR engine.

DESCRIPTION OF THE PREFERRED EMBODIMENTS

Figure 1:
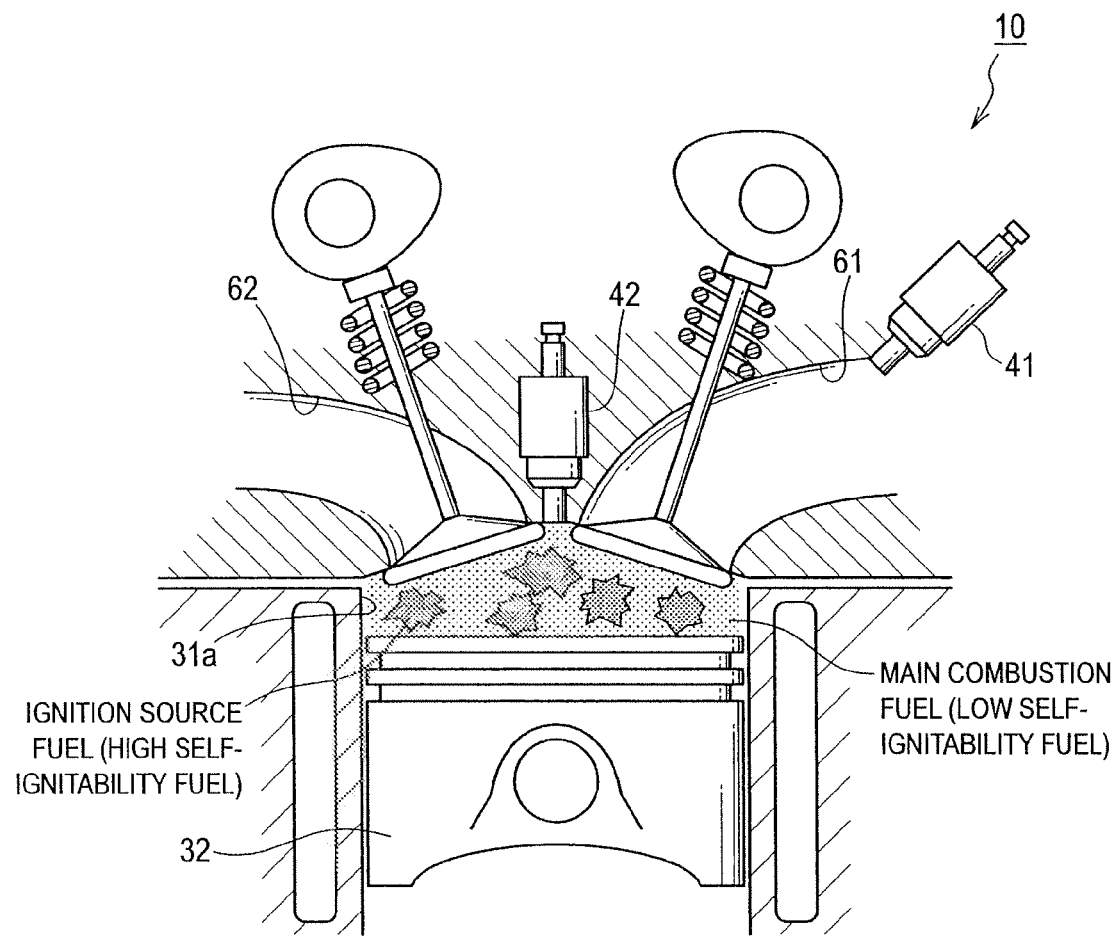
FIG. 1 is a schematic diagram showing the constitution of a combustion control device for an internal combustion engine, according to this invention.

Referring to FIG. 1 of the drawings, an internal combustion engine 10 for a vehicle comprises a first injector 41 and a second injector 42.

The first injector 41 is provided in an intake port 61. The first injector 41 injects fuel into the intake port. This fuel performs main combustion in a cylinder. The fuel is a fuel that has a high octane value and low self-ignitability, such as gasoline, for example.

The second injector 42 is provided so as to face a cylinder 31a from the center of a cylinder head. The second injector 42 injects fuel in a compression stroke. The second injector 42 is a multiple injection hole nozzle. The second injector 42 injects the fuel such that the fuel is dispersed to a plurality of locations within the cylinder. This fuel serves as an ignition source inside the cylinder. The fuel is a fuel that has a low octane value and high self-ignitability, such as light oil, for example.

In an exhaust stroke and an intake stroke, the main combustion fuel injected by the first injector 41 mixes with air in the intake port 61. The main combustion fuel is then aspirated into the cylinder 31a. Thus, the main combustion fuel forms a lean premixed gas.

Figure 2:
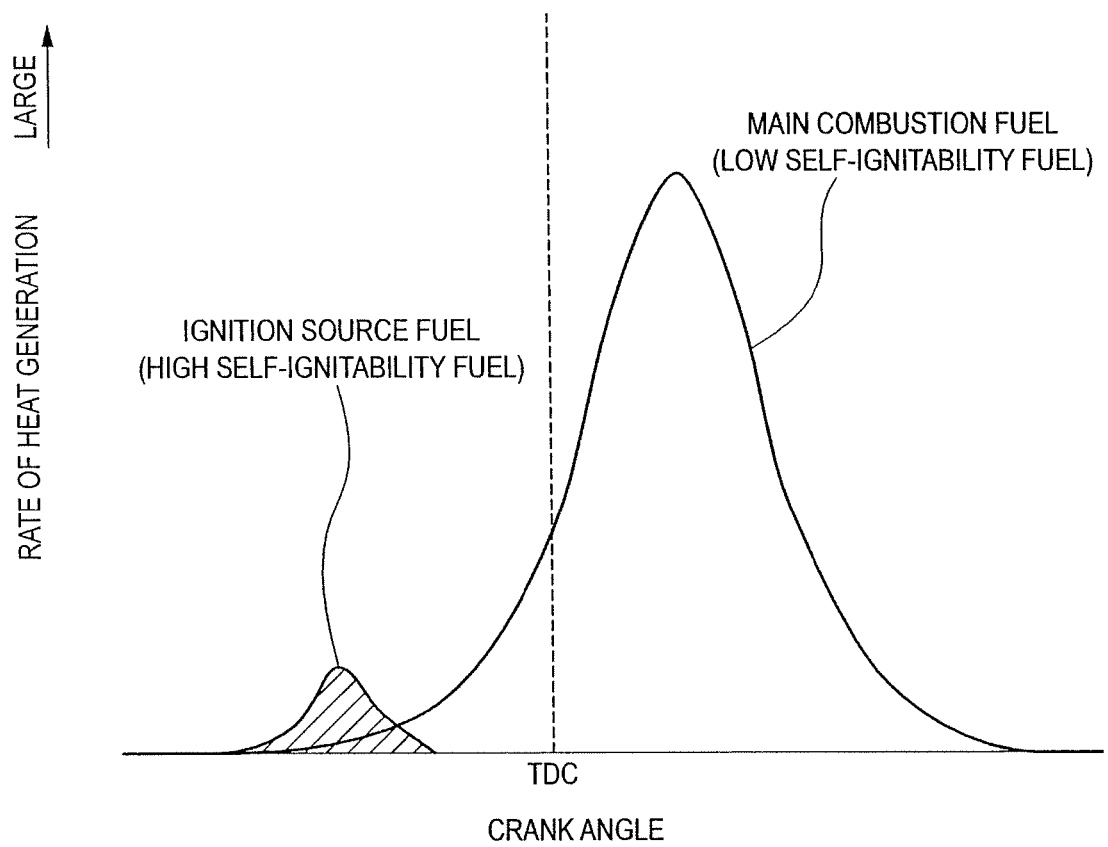
FIG. 2 is a diagram illustrating heat generation from a fuel that performs main combustion and a fuel that serves as an ignition source.

In the compression stroke, the ignition source fuel is injected from the second injector 42. The ignition source fuel is injected in a comparatively small amount. The ignition source fuel disperses through the premixed gas in the form of a plurality of atomized masses. The ignition source fuel has a low octane value and high self-ignitability. Therefore, the ignition source fuel self-ignites when a piston 32 approaches compression top dead center. The ignition source fuel dispersed through the cylinder 31a ignites in a plurality of locations. Flames then propagate from the ignition source fuel, causing the premixed gas to burn. FIG. 2 illustrates heat generation at this time. The ignition source fuel injected from the second injector 42 immediately prior to top dead center ignites during the compression stroke, thereby generating heat. Flames propagate from the ignition source fuel, causing the premixed gas of the main combustion fuel to burn.

The internal combustion engine 10 is a Variable Compression Ratio engine (to be abbreviated to VCR engine hereafter) having a multilink mechanism that connects the piston to a crankshaft using two links.

In an internal combustion engine with a fixed compression ratio (to be referred to as a normal engine hereafter), the piston and crankshaft are connected by a single link, i.e., a connecting rod. The top dead center position of the piston is fixed in a normal engine. The mechanical compression ratio of a normal engine does not vary.

In a VCR engine, however, the top dead center position of the piston can be modified. When the piston top dead center position falls, the distance from a piston crown surface to a cylinder ceiling surface widens, causing the mechanical compression ratio to decrease. When the piston top dead center position rises, the distance from the piston crown surface to the cylinder ceiling surface narrows, causing the mechanical compression ratio to increase.

When the mechanical compression ratio varies, the internal pressure of the cylinder in the vicinity of compression top dead center varies, as does the internal temperature of the cylinder in the vicinity of compression top dead center. A correlation exists between the mechanical compression ratio and the internal pressure of the cylinder. A correlation also exists between the internal pressure of the cylinder and the internal temperature of the cylinder. Accordingly, a correlation also exists between the mechanical compression ratio and the internal temperature of the cylinder. Whether or not the fuel self-ignites is influenced by the internal temperature of the cylinder in the vicinity of compression top dead center. Hence, in a VCR engine, the self-ignitability of the fuel is preferably modified in accordance with the mechanical compression ratio. However, this invention may also be applied to a normal engine. In the case of a normal engine, the internal temperature of the cylinder in the vicinity of compression top dead center is preferably estimated on the basis of a detected pressure of a cylinder internal pressure sensor. The internal temperature of the cylinder in the vicinity of compression top dead center may also be estimated on the basis of an intake air temperature.

Figure 3:
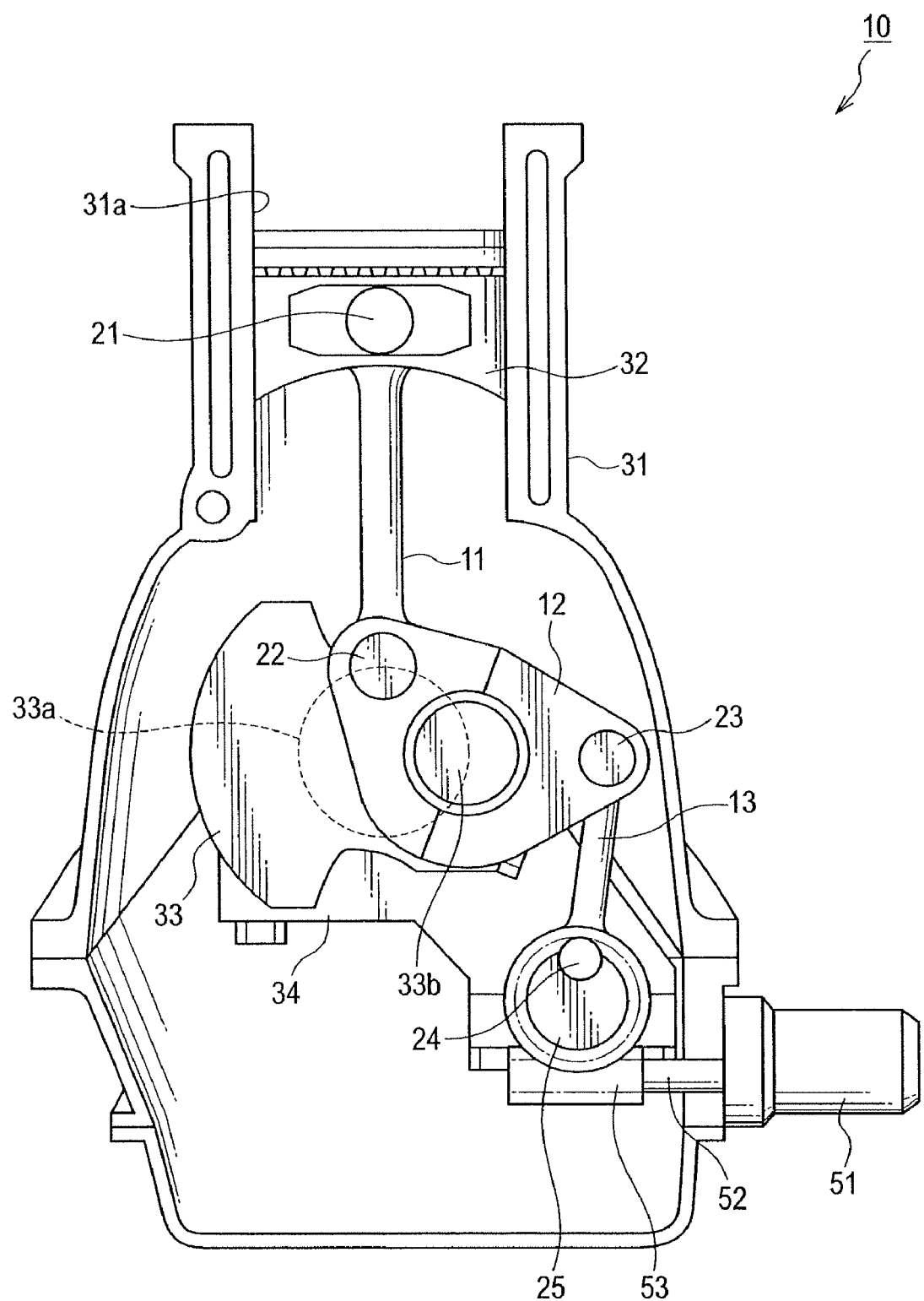
FIG. 3 is a schematic longitudinal cross-sectional view showing the constitution of a VCR engine to which this invention is applied.

Referring to FIG. 3, a VCR engine will be described. FIG. 3 is a view seen from an axial direction of a crankshaft. Those skilled in the art of internal combustion engines commonly use the terms top dead center/bottom dead center separately from the gravitational direction. In a horizontally opposed engine or the like, it is not always the case that top dead center and bottom dead center denote the top and bottom of the gravitational direction, respectively. Furthermore, if the engine were inverted, top dead center and bottom dead center would become the bottom and top of the gravitational direction, respectively. In this specification, however, in accordance with common usage, the top dead center side and bottom dead center side are assumed to denote the top and bottom, respectively.

In a VCR engine 10, a piston 32 is connected to a crankshaft 33 via an upper link 11 and a lower link 12. The VCR engine 10 is capable of modifying the mechanical compression ratio by displacing an oscillation center of a control link 13.

The piston 32 reciprocates through the interior of a cylinder 31 a in a cylinder block 31 after receiving combustion pressure.

An upper end of the upper link 11 is connected to the piston 32 via a piston pin 21. A lower end of the upper link 11 is connected to one end of the lower link 12 via an upper pin 22.

Another end of the lower link 12 is connected to the control link 13 via a connecting pin 23. A crank pin 33b of the crankshaft 33 is inserted into a connecting hole located substantially centrally in the lower link 12. The lower link 12 rotates about the crank pin 33b.

The crankshaft 33 includes a plurality of crank journals 33a and the crank pin 33b. The crank journals 33a are supported by the cylinder block 31 and a ladder frame 34 so as to be free to rotate. The crank pin 33b is offset from the crank journals 33a by a predetermined amount. The lower link 12 is connected to the crank pin 33b so as to be free to rotate.

A tip end of the control link 13 is connected to the lower link 12 via the connecting pin 23. Another end of the control link 13 is connected to a control shaft 25 via a connecting pin 24. The control link 13 oscillates about the connecting pin 24. The connecting pin 24 is provided near an outer periphery of the control shaft 25.

A gear is formed on the outer periphery of the control shaft 25. The gear meshes with a worm gear 53 provided on a rotary shaft 52 of an actuator 51. When the rotary shaft 52 of the actuator 51 rotates, the control shaft 25 rotates via the worm gear 53. The connecting pin 24 then moves in a circumferential direction of the control shaft 25.

After receiving combustion pressure, the piston 32 falls through the cylinder 31a of the cylinder block 31. As a result, the crankshaft 33 rotates. As shown in FIG. 4A, at bottom dead center, a counterweight is in a substantially uppermost position, and the crank pin 33b is in a substantially lowermost position. As shown in FIG. 4B, at top dead center, the counterweight is in the substantially lowermost position, and the crank pin 33b is in the substantially uppermost position.

Referring to FIGS. 5A-5C, a method of modifying the mechanical compression ratio of the VCR engine will be described.

The mechanical compression ratio of the VCR engine can be modified by rotating the control shaft 25 to modify the position of the connecting pin 24.

As shown in FIG. 5A and FIG. 5C, when the connecting pin 24 is set in a position A, top dead center becomes higher, whereby the mechanical compression ratio becomes a high compression ratio.

As shown in FIG. 5B and FIG. 5C, on the other hand, when the connecting pin 24 is set in a position B, the control link 13 is pushed upward such that the position of the connecting pin 23 rises. As a result, the lower link 12 rotates counter-clockwise about the crank pin 33b, causing the connecting pin 22 to fall and top dead center to become lower. Accordingly, the mechanical compression ratio becomes a low compression ratio.

Figure 6:
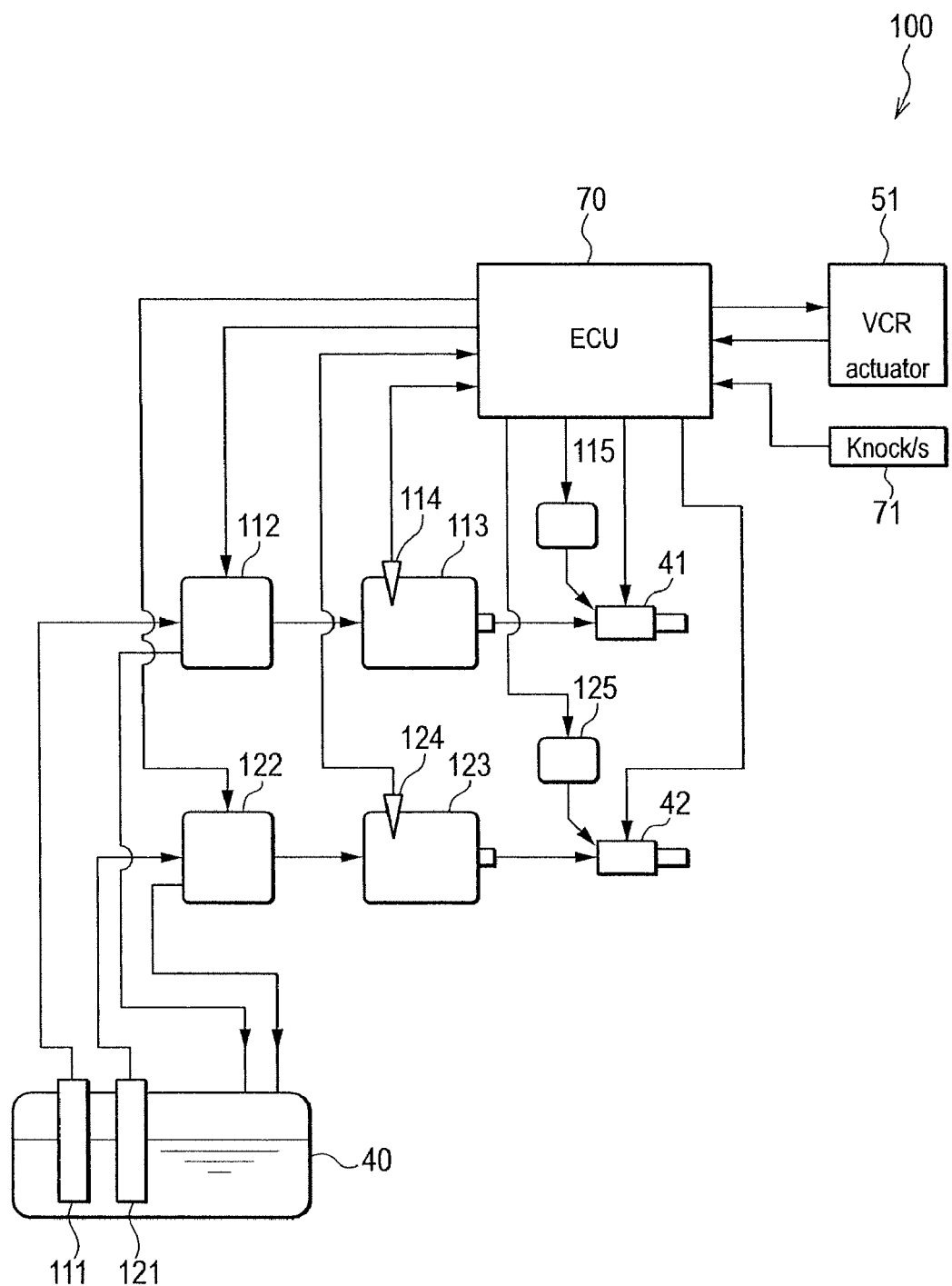
FIG. 6 is a schematic diagram showing the constitution of a fuel injection system to which this invention is applied.

Referring to FIG. 6, a fuel injection system will be described.

A fuel injection system 100 is a system for injecting fuel, which is supplied from the outside and stored in a fuel tank 40, from the first injector 41 and second injector 42.

The fuel injection system 100 comprises a first fuel pump 111, a first fuel reformer 112, a main combustion fuel tank 113, an octane value improver adding device 115, the first fuel injector 41, a second fuel pump 121, a second fuel reformer 122, an ignition source fuel tank 123, a cetane value improver adding device 125, and the second fuel injector 42.

The first fuel pump 111 supplies the fuel that is supplied from the outside and stored in the fuel tank 40 to the first fuel reformer 112.

The first fuel reformer 112 uses the exhaust heat of the engine to reform the fuel by means of a reforming catalyst, thereby increasing the octane value of the fuel such that the self-ignitability thereof decreases. This low self-ignitability fuel serves as main combustion fuel.

The main combustion fuel tank 113 stores the low self-ignitability fuel reformed by the first fuel reformer 112. The main combustion fuel tank 113 supplies the fuel to the first fuel injector 41. The octane value, or in other words the self-ignitability, of the main combustion fuel tank 113 is detected by a fuel property sensor 114.

The octane value improver adding device 115 adds an octane value improver to the fuel supplied to the first fuel injector 41.

The first fuel injector 41 injects the octane value-adjusted fuel.

The second fuel pump 121, second fuel reformer 122, ignition source fuel tank 123, cetane value improver adding device 125, and second fuel injector 42 are basically identical to their counterparts. Specifically, the second fuel pump 121 supplies the fuel that is supplied from the outside and stored in the fuel tank 40 to the second fuel reformer 122. The second fuel reformer 122 reforms the fuel to lower the octane value of the fuel such that the self-ignitability thereof increases. This high self-ignitability fuel serves as ignition source fuel. The ignition source fuel tank 123 stores the high self-ignitability fuel reformed by the second fuel reformer 122. The ignition source fuel tank 123 supplies the fuel to the second fuel injector 42. The octane value, or in other words the self-ignitability, of the ignition source fuel tank 123 is detected by a fuel property sensor 124. The cetane value improver adding device 125 adds a cetane value improver to the fuel supplied to the second fuel injector 42. The second fuel injector 42 injects the cetane value-adjusted fuel.

A controller 70 inputs signals from the fuel property sensor 114 and the fuel property sensor 124. The controller 70 also inputs a signal from a knock sensor 71.

On the basis of the input signals, the controller 70 adjusts the degree of reformation by controlling conditions such as the amount of fuel and amount of air supplied to the first fuel reformer 112, and the catalyst temperature. The controller 70 also adjusts the octane value of the fuel, or in other words its self-ignitability, by controlling the octane value improver adding device 115. Similarly, on the basis of the input signals, the controller 70 adjusts the degree of reformation by controlling conditions such as the amount of fuel and amount of air supplied to the second fuel reformer 122, and the catalyst temperature. The controller 70 also adjusts the cetane value of the fuel, or in other words its self-ignitability, by controlling the cetane value improver adding device 125.

The controller 70 controls the injection timing and injection amount of the first fuel injector 41 and second fuel injector 42.

The controller 70 determines the mechanical compression ratio in accordance with operating conditions, and rotates the control shaft 25 by controlling the actuator 51 such that the determined mechanical compression ratio is obtained.

The controller 70 comprises a microcomputer provided with a central processing unit (CPU), read-only memory (ROM), random access memory (RAM) and input/output interface (I/O interface). The controller may comprise plural microcomputers.

The inventors have developed a VCR engine having a multilink mechanism in which the piston and crankshaft are connected by two links. When the mechanical compression ratio varies, the internal pressure of the cylinder in the vicinity of compression top dead center varies, as does the internal temperature of the cylinder in the vicinity of compression top dead center. A correlation exists between the mechanical compression ratio and the internal pressure of the cylinder. A correlation also exists between the internal pressure of the cylinder and the internal temperature of the cylinder. Accordingly, a correlation also exists between the mechanical compression ratio and the internal temperature of the cylinder. Whether or not the fuel self-ignites is influenced by the internal temperature of the cylinder in the vicinity of compression top dead center. Hence, particularly in an HCCI internal combustion engine having a multilink mechanism, the self-ignitability of the fuel is preferably modified in accordance with the mechanical compression ratio.

Figure 7:
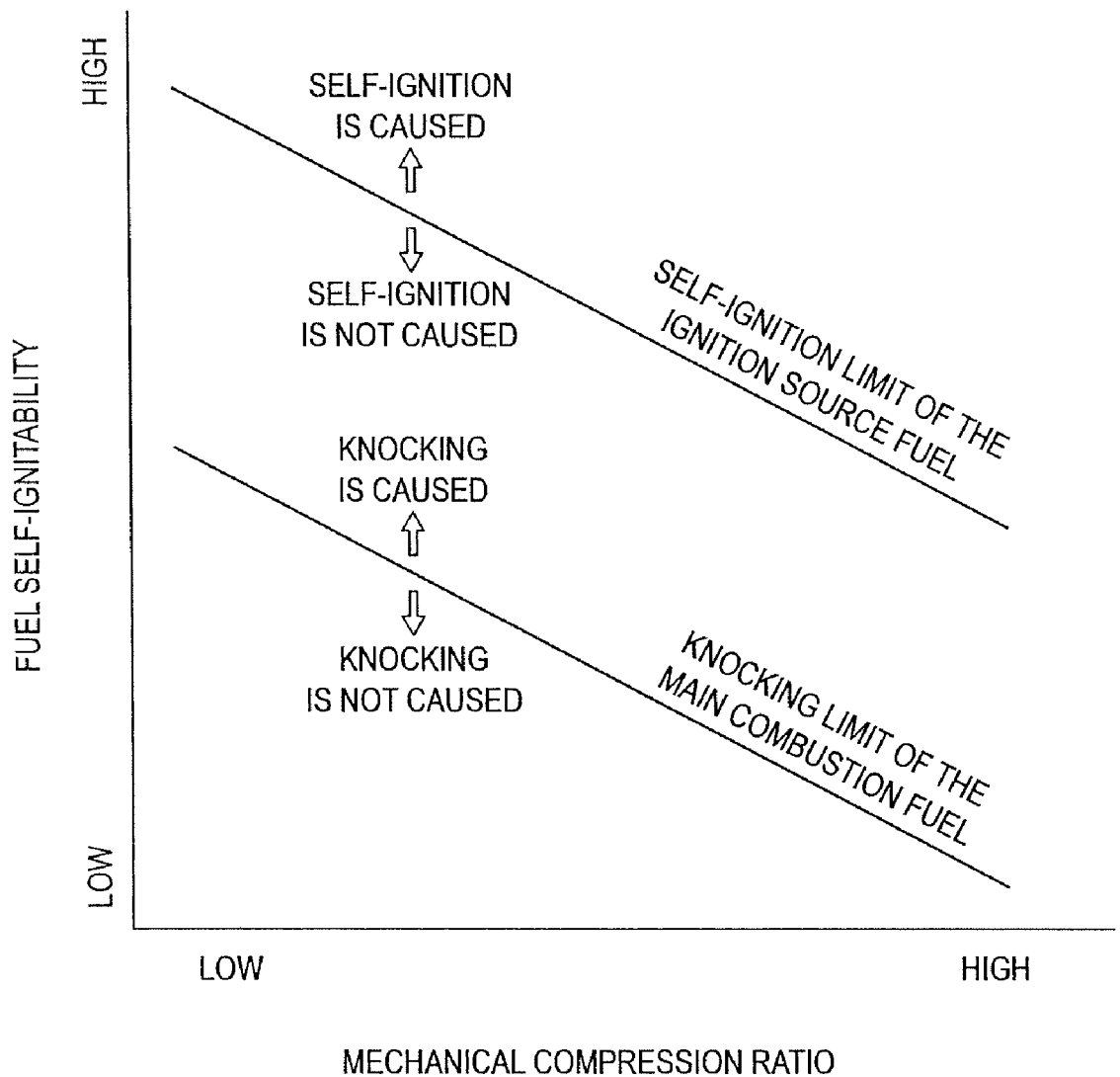
FIG. 7 is a diagram showing an example of a relationship between the self-ignitability of the main combustion fuel, which is injected into an intake port, the self-ignitability of the ignition source fuel, which is injected into a cylinder, and the mechanical compression ratio.

FIG. 7 shows an example of the relationship between a knocking limit of the main combustion fuel, which is injected into the intake port, a self-ignition limit of the ignition source fuel, which is injected into the cylinder, and the mechanical compression ratio.

When the mechanical compression ratio varies, the self-ignition limit of the ignition source fuel and the knocking limit of the main combustion fuel vary. The self-ignition limit of the ignition source fuel decreases as the mechanical compression ratio increases. The knocking limit of the main combustion fuel decreases as the mechanical compression ratio increases.

The self-ignitability of the ignition source fuel is adjusted so as to be greater than the self-ignition limit shown in FIG. 7. The adjusted fuel is then injected in the cylinder during a compression stroke such that the adjusted fuel self-ignites.

The self-ignitability of the main combustion fuel is adjusted so as to be lower than the knocking limit shown in FIG. 7. The adjusted fuel is then injected in the intake port such that the adjusted fuel does not produce a knock.

Using this characteristic, the inventors have devised an idea of detecting one of the self-ignitability of the main combustion fuel injected into the intake port, the self-ignitability of the ignition source fuel injected into the cylinder, and the mechanical compression ratio, and controlling the other two in accordance with the resulting detection value.

A specific constitution for realizing this technical idea will now be described.

Figure 8:
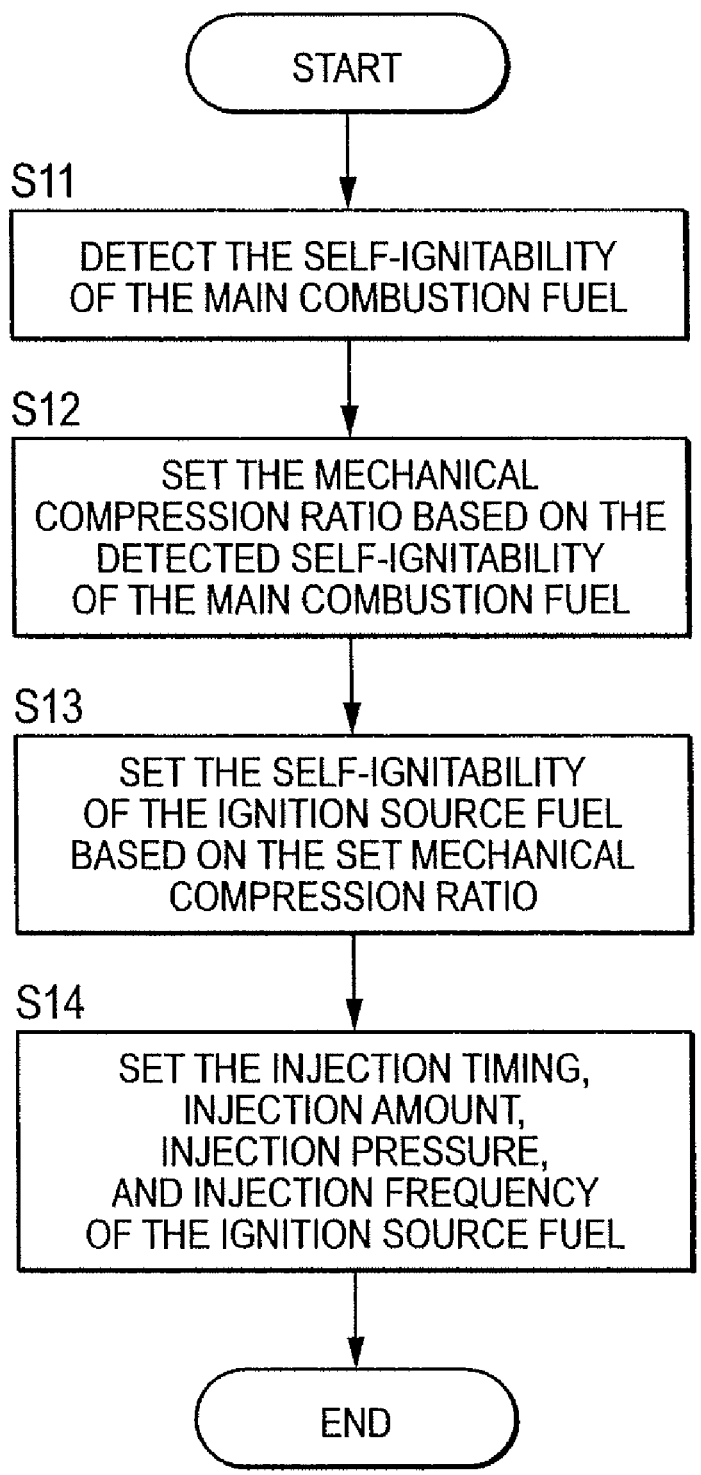
FIG. 8 is a flowchart showing a routine executed by a controller according to this invention to detect the self-ignitability of the main combustion fuel and set the mechanical compression ratio and the self-ignitability of the ignition source fuel in accordance with a resulting detection value.

Firstly, a method of detecting the self-ignitability of the main combustion fuel and setting the mechanical compression ratio and the self-ignitability of the ignition source fuel in accordance with a resulting detection value will be described with reference to FIG. 8.

By executing the routine shown in the figure, the controller 70 sets the mechanical compression ratio and the self-ignitability of the ignition source fuel on the basis of the self-ignitability of the main combustion fuel. In the following description, the mechanical compression ratio represents an internal cylinder pressure when the ignition source fuel ignites in the vicinity of compression top dead center. This routine is executed repeatedly while the engine 10 is operative at fixed intervals of 10 milliseconds, for example.

In a step S1, the controller 70 detects the octane value, or in other words the self-ignitability, of the main combustion fuel on the basis of a signal from the fuel property sensor 114. It should be noted, however, that if the following method is employed, the self-ignitability of the main combustion fuel can be detected without using the fuel property sensor 114. First, the octane value improver adding device 115 adds an octane value improver to fuel injected by the first fuel injector 41 during an idle operation. A knock level is then detected by the knock sensor 71. The self-ignitability of the main combustion fuel can be detected from the relationship between the octane improver addition amount and the knocking.

Figure 9:
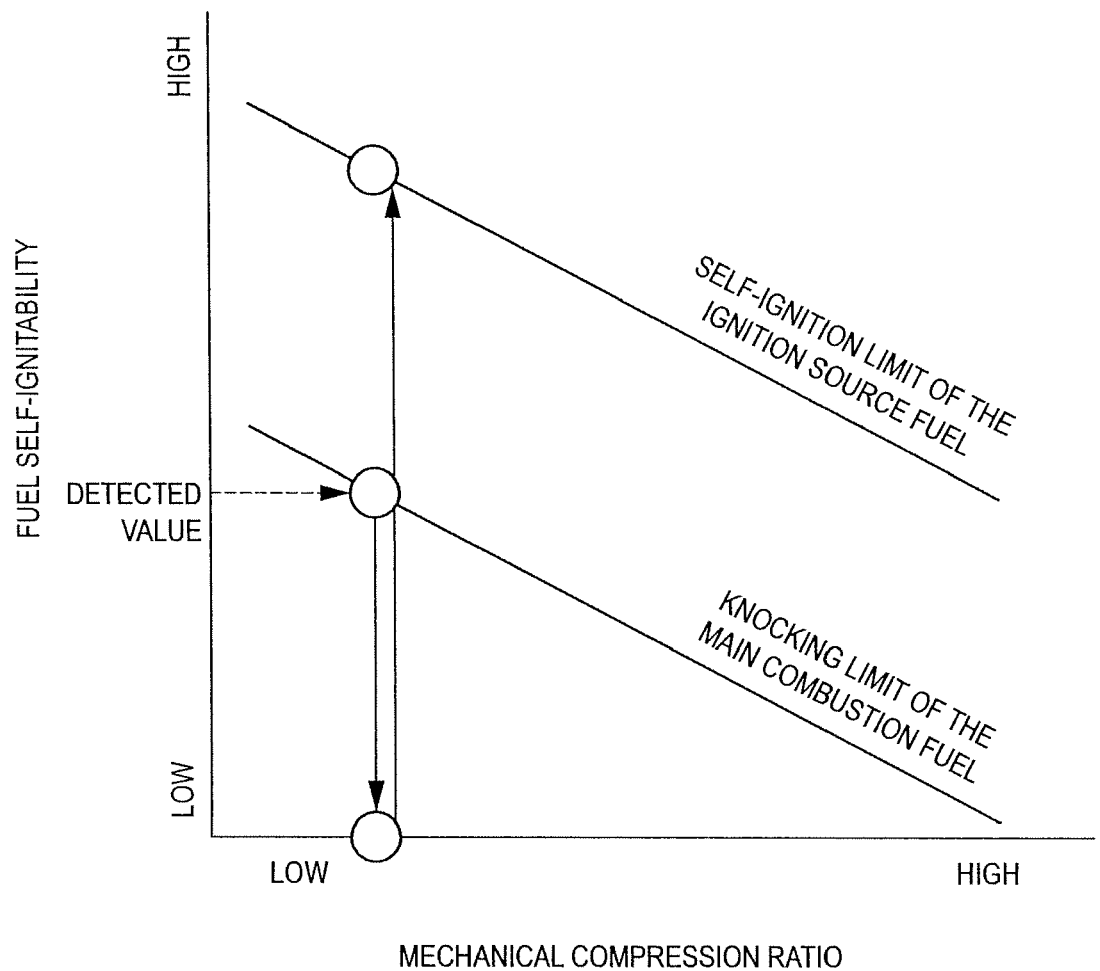
FIG. 9 is a diagram illustrating a process performed through execution of the routine in FIG. 8 by the controller to determine the self-ignitability of the ignition source fuel and the mechanical compression ratio based on the self-ignitability of the main combustion fuel.

In a step S12, the controller 70 sets the mechanical compression ratio such that knocking is not caused by the main combustion fuel at the detected self-ignitability of the main combustion fuel. More specifically, as shown in FIG. 9, the controller 70 sets the mechanical compression ratio such that the detected self-ignitability of the main combustion fuel constitutes a main combustion knocking limit. The controller 70 then realizes the mechanical compression ratio by controlling the actuator 51.

In a step S13, the controller 70 sets the self-ignitability of the ignition source fuel such that the ignition source fuel self-ignites at the set mechanical compression ratio. More specifically, as shown in FIG. 9, the controller 70 sets the self-ignitability of the ignition source fuel such that when the set mechanical compression ratio is reached, the self-ignitability of the ignition source fuel is equal to or greater than a self-ignition limit. The controller 70 realizes this self-ignitability by controlling the second fuel reformer 122 and the cetane value improver adding device 125.

In a step S14, the controller 70 sets the injection timing, injection amount, injection pressure, and injection frequency of the ignition source fuel.

Figure 10A:
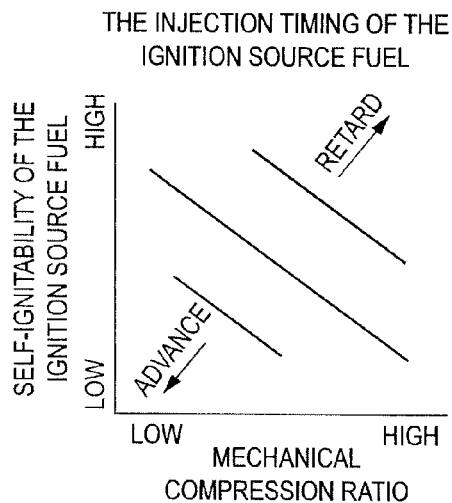
FIGS. 10A-10D are diagrams showing examples of maps stored by the controller for setting an injection timing, an injection amount, an injection pressure, and an injection frequency of the ignition source fuel.

More specifically, the injection timing of the ignition source fuel is set by applying the mechanical compression ratio and the self-ignitability of the ignition source fuel to a map having the characteristics shown in FIG. 10A, which is set in advance through experiment and stored in the ROM. The injection timing of the ignition source fuel is set steadily further toward a retardation side as the mechanical compression ratio increases and the self-ignitability of the ignition source fuel increases.

Figure 10B:
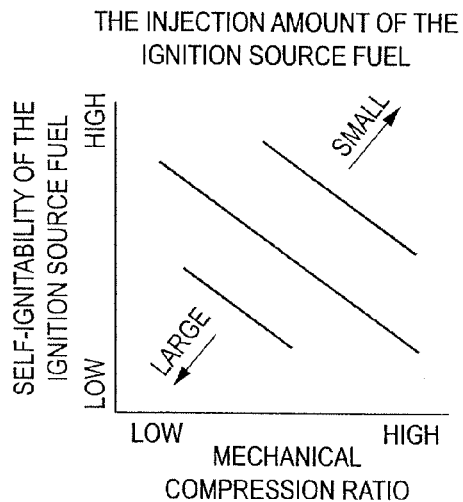

Further, the injection amount of the ignition source fuel is set by applying the mechanical compression ratio and the self-ignitability of the ignition source fuel to a map having the characteristics shown in FIG. 10B, which is set in advance through experiment and stored in the ROM. The injection amount of the ignition source fuel is set steadily further toward a small amount side as the mechanical compression ratio increases and the self-ignitability of the ignition source fuel increases.

Figure 10C:
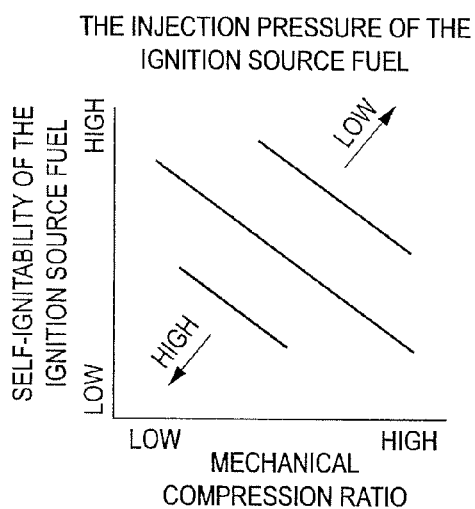

Further, the injection pressure of the ignition source fuel is set by applying the mechanical compression ratio and the self-ignitability of the ignition source fuel to a map having the characteristics shown in FIG. 10C, which is set in advance through experiment and stored in the ROM. The injection pressure of the ignition source fuel is set steadily further toward a low pressure side as the mechanical compression ratio increases and the self-ignitability of the ignition source fuel increases.

Figure 10D:
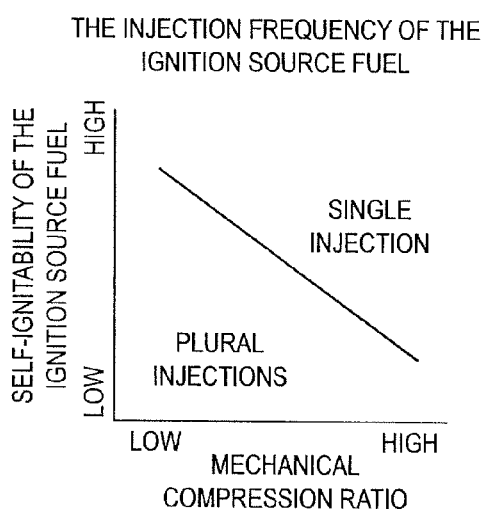

Further, the injection frequency of the ignition source fuel is set by applying the mechanical compression ratio and the self-ignitability of the ignition source fuel to a map having the characteristics shown in FIG. 10D, which is set in advance through experiment and stored in the ROM. The injection frequency of the ignition source fuel is set at a single injection (one injection) when the mechanical compression ratio is high and the self-ignitability of the ignition source fuel is high. When the mechanical compression ratio is low and the self-ignitability of the ignition source fuel is low, the injection frequency of the ignition source fuel is set at plural injections (two or more injections).

In this embodiment, the self-ignitability of the main combustion fuel is detected. The mechanical compression ratio is then set such that knocking is not caused by the main injection fuel at the detected self-ignitability of the main combustion fuel. The self-ignitability of the ignition source fuel is then set such that the ignition source fuel self-ignites at the set mechanical compression ratio. Finally, the injection timing, injection amount, injection pressure, and injection frequency of the ignition source fuel are set.

In so doing, an optimum mechanical compression ratio can be set in accordance with the self-ignitability of the main combustion fuel, and compression ignition can be achieved reliably. Hence, the combustion conditions of the engine can be controlled appropriately, regardless of the engine operating conditions.

Figure 11:
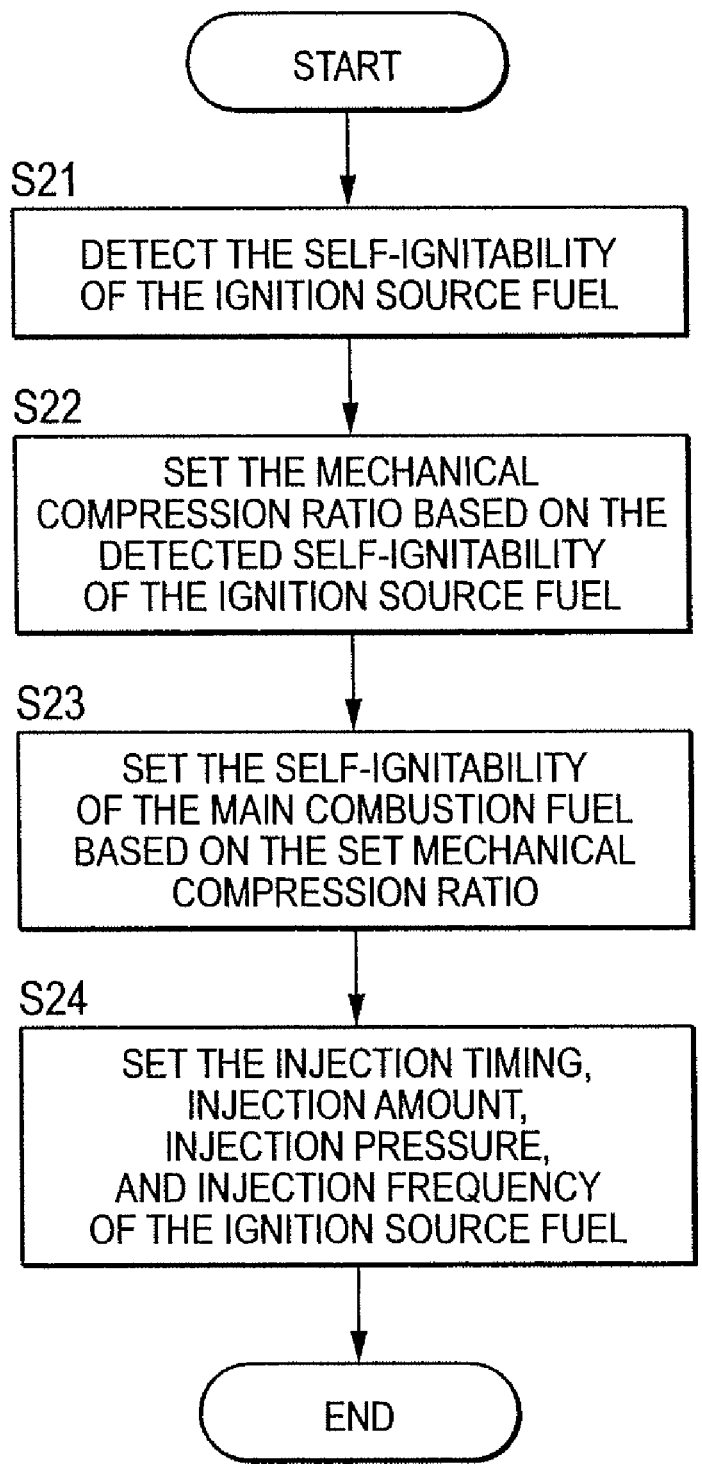
FIG. 11 is a flowchart showing a routine executed by the controller to detect the self-ignitability of the ignition source fuel and set the mechanical compression ratio and the self-ignitability of the main combustion fuel in accordance with a resulting detection value.

Secondly, a method of detecting the self-ignitability of the ignition source fuel and setting the mechanical compression ratio and the self-ignitability of the main combustion fuel in accordance with a resulting detection value will be described with reference to FIG. 11.

By executing the routine shown in the figure, the controller 70 sets the mechanical compression ratio and the self-ignitability of the main combustion fuel on the basis of the self-ignitability of the ignition source fuel. This routine is executed repeatedly while the engine 10 is operative at fixed intervals of 10 milliseconds, for example.

In a step S21, the controller 70 detects the octane value, or in other words the self-ignitability, of the ignition source fuel on the basis of a signal from the fuel property sensor 124. It should be noted, however, that if the following method is employed, the self-ignitability of the ignition source fuel can be detected without using the fuel property sensor 124. First, the cetane value improver adding device 125 adds a cetane value improver to fuel injected by the second fuel injector 42 during an idle operation. A knock level is then detected by the knock sensor 71. The self-ignitability of the ignition source fuel can be detected from the relationship between the cetane improver addition amount and the knocking.

Figure 12:
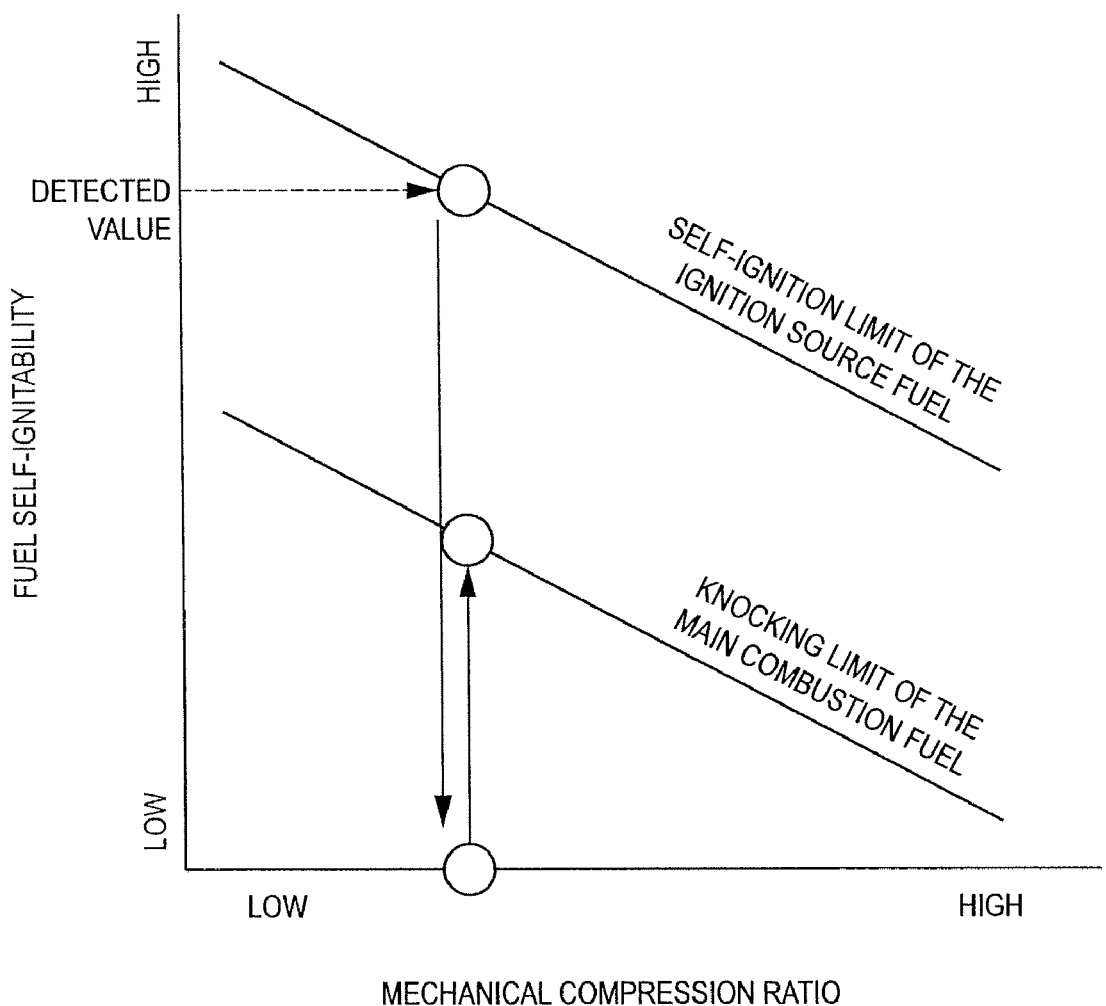
FIG. 12 is a diagram illustrating a process performed through execution of the routine in FIG. 11 by the controller to determine the self-ignitability of the main combustion fuel and the mechanical compression ratio based on the self-ignitability of the ignition source fuel.

In a step S22, the controller 70 sets the mechanical compression ratio such that the ignition source fuel self-ignites at the detected self-ignitability of the ignition source fuel. More specifically, as shown in FIG. 12, the controller 70 sets the mechanical compression ratio such that the detected self-ignitability of the ignition source fuel constitutes the self-ignition limit. The controller 70 then realizes the mechanical compression ratio by controlling the actuator 51.

In a step S23, the controller 70 sets the self-ignitability, or in other words the octane value, of the main combustion fuel such that the main combustion fuel does not self-ignite and knocking does not occur at the set mechanical compression ratio. More specifically, as shown in FIG. 12, the controller 70 sets the self-ignitability of the main combustion fuel at a self-ignition limit, at which the main combustion fuel does not self-ignite at the set mechanical compression ratio, or in other words a knocking limit. The controller 70 realizes this self-ignitability by controlling the first fuel reformer 112 and the octane value improver adding device 115.

In a step S24, the controller 70 sets the injection timing, injection amount, injection pressure, and injection frequency of the ignition source fuel in a similar manner to the step S14 of the first embodiment.

In this embodiment, the self-ignitability of the ignition source fuel is detected. The mechanical compression ratio is then set such that the ignition source fuel self-ignites reliably at the detected self-ignitability of the ignition source fuel. The self-ignitability of the main combustion fuel is then set such that knocking does not occur during main combustion at the set mechanical compression ratio.

In so doing, an optimum mechanical compression ratio can be set in accordance with the self-ignitability of the ignition source fuel, and knocking during main combustion can be prevented reliably. Hence, the combustion conditions of the engine can be controlled appropriately, regardless of the engine operating conditions.

Figure 13:
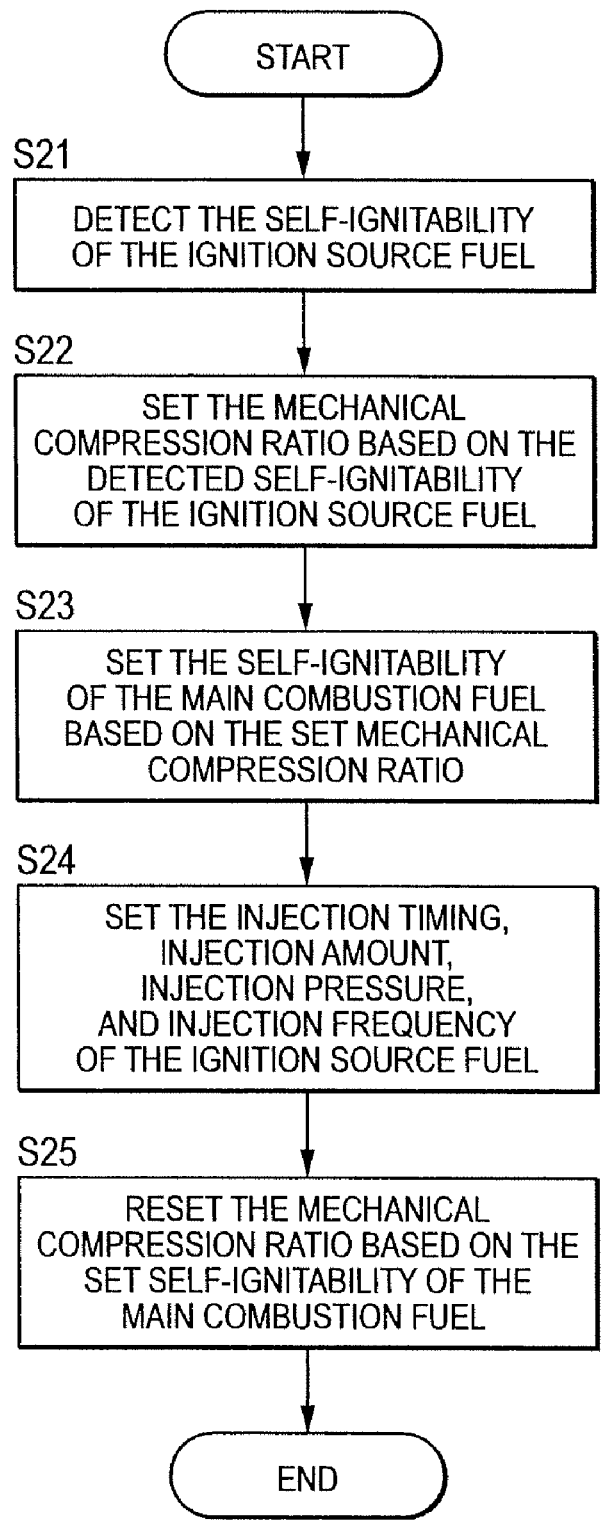
FIG. 13 is a flowchart showing a routine executed by the controller to detect the self-ignitability of the ignition source fuel, set the mechanical compression ratio and the self-ignitability of the main combustion fuel in accordance with a resulting detection value, and then reset the mechanical compression ratio.
Figure 14:
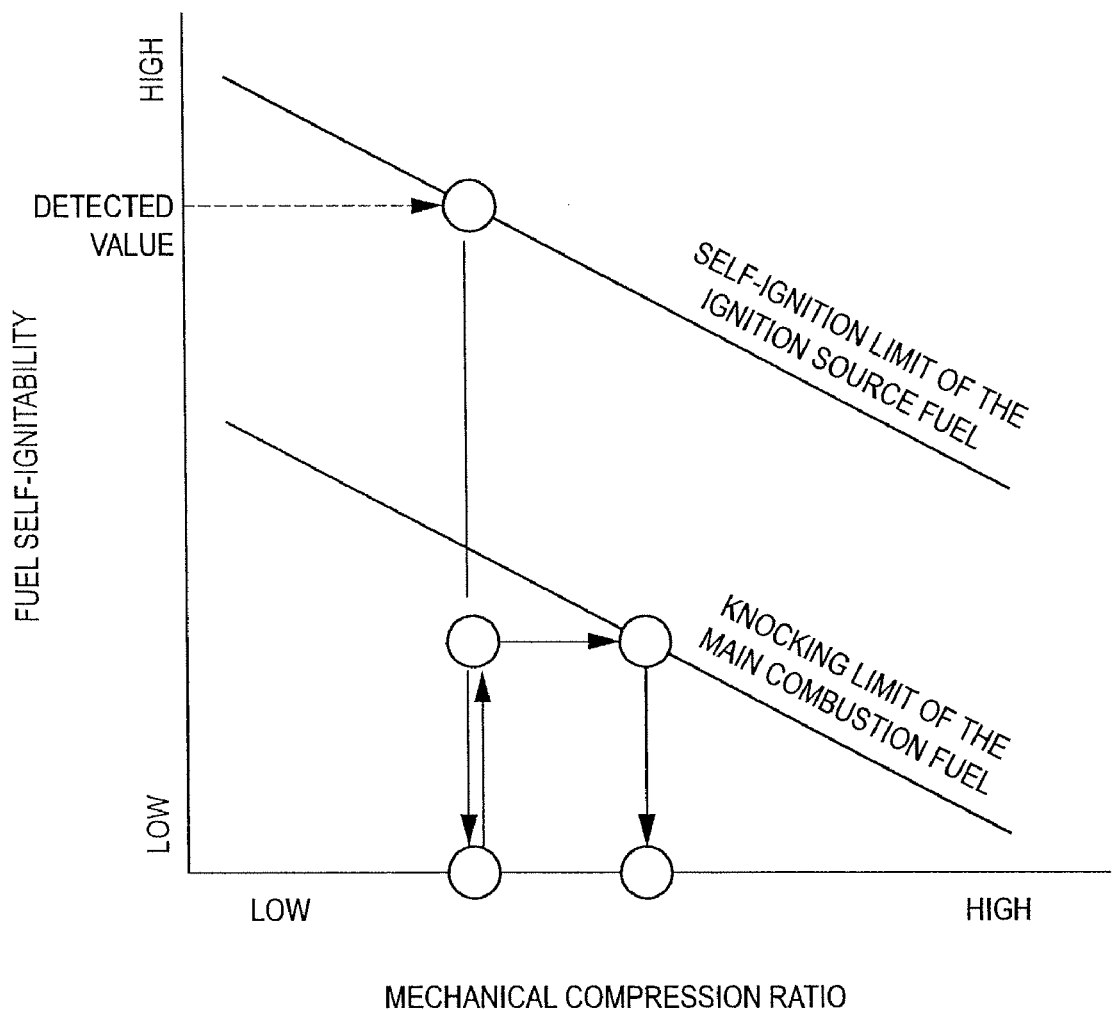
FIG. 14 is a diagram illustrating a process performed through execution of the routine in FIG. 13 by the controller to determine the self-ignitability of the main combustion fuel and the mechanical compression ratio based on the self-ignitability of the ignition source fuel.

It should be noted that when the self-ignitability of the main combustion fuel can be set lower than the main combustion knocking limit, as shown in a step S25 of FIG. 13 and FIG. 14, the mechanical compression ratio is preferably raised to a limit at which knocking is not caused by the main combustion fuel at the self-ignitability of the main combustion fuel. In so doing, the engine output can be improved.

Figure 15:
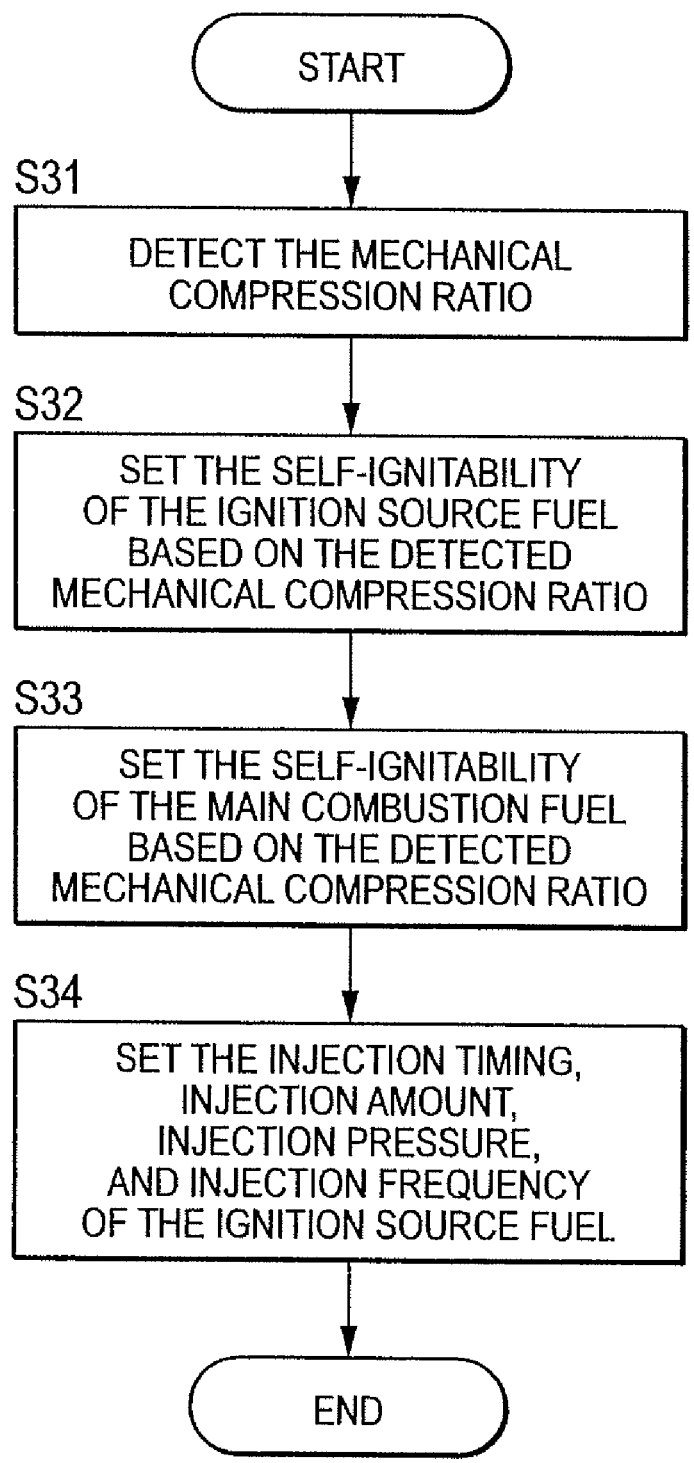
FIG. 15 is a flowchart showing a routine executed by the controller to detect the mechanical compression ratio and set the self-ignitability of the main combustion fuel and the self-ignitability of the ignition source fuel in accordance with a resulting detection value.

Thirdly, a method of detecting the mechanical compression ratio and setting the self-ignitability of the main combustion fuel and the self-ignitability of the ignition source fuel in accordance with a resulting detection value will be described with reference to FIG. 15.

By executing the routine shown in the figure, the controller 70 sets the self-ignitability of the main combustion fuel and the self-ignitability of the ignition source fuel on the basis of the mechanical compression ratio. This routine is executed repeatedly while the engine 10 is operative at fixed intervals of 10 milliseconds, for example.

In a step S31, the controller 70 detects the mechanical compression ratio of the VCR engine. More specifically, the controller 70 may detect the mechanical compression ratio on the basis of a command signal issued to the actuator 51. Alternatively, a sensor that detects the position of a movable member of the VCR engine may be provided, and the mechanical compression ratio may be detected on the basis of a sensor signal thereof.

Figure 16:
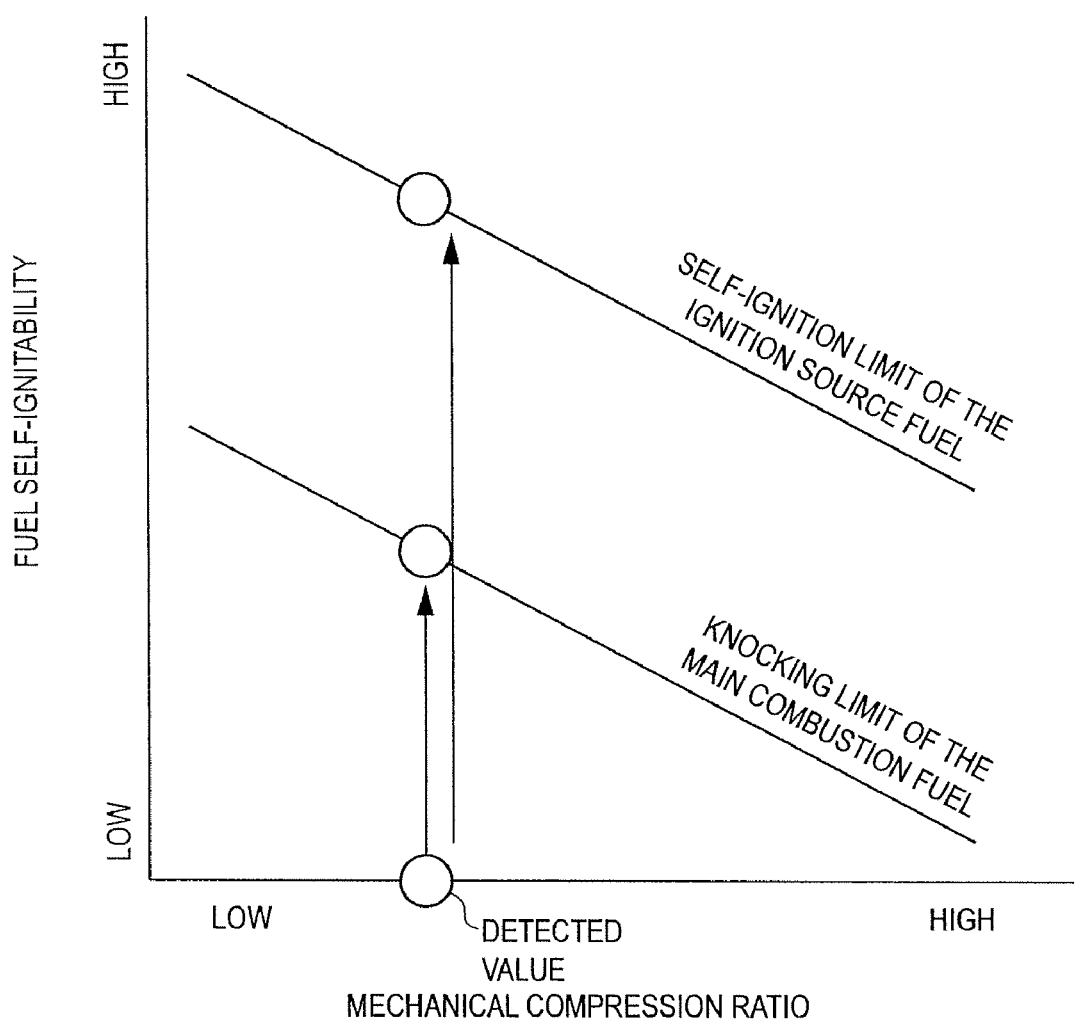
FIG. 16 is a diagram illustrating a process performed through execution of the routine in FIG. 15 by the controller to determine the self-ignitability of the ignition source and the self-ignitability of the main combustion fuel based on the mechanical compression ratio.

In a step S32, the controller 70 sets the self-ignitability of the ignition source fuel such that the ignition source fuel self-ignites at the detected mechanical compression ratio. More specifically, as shown in FIG. 16, the controller 70 sets the self-ignitability of the ignition source fuel so as to reach or exceed the self-ignition limit at the detected mechanical compression ratio.

In a step S33, the controller 70 sets the self-ignitability, or in other words the octane value, of the main combustion fuel such that the main combustion fuel does not self-ignite and knocking does not occur at the detected mechanical compression ratio. More specifically, as shown in FIG. 16, the controller 70 sets the self-ignitability of the main combustion fuel at a self-ignition limit, at which the main combustion fuel does not self-ignite at the detected mechanical compression ratio, or in other words a knocking limit.

In a step S34, the controller 70 sets the injection timing, injection amount, injection pressure, and injection frequency of the ignition source fuel in a similar manner to the step S14 of the first embodiment.

In this embodiment, the mechanical compression ratio of the VCR engine is detected. The self-ignitability, or in other words the octane value, of the main combustion fuel is then set such that the main combustion fuel does not self-ignite and knocking does not occur at the detected mechanical compression ratio. The self-ignitability of the ignition source fuel is then set such that the ignition source fuel self-ignites at the detected mechanical compression ratio.

In so doing, knocking during main combustion can be prevented reliably in accordance with the mechanical compression ratio of the VCR engine. Moreover, compression ignition can be achieved reliably. Hence, the combustion conditions of the engine can be controlled appropriately, regardless of the engine operating conditions.

Figure 17:
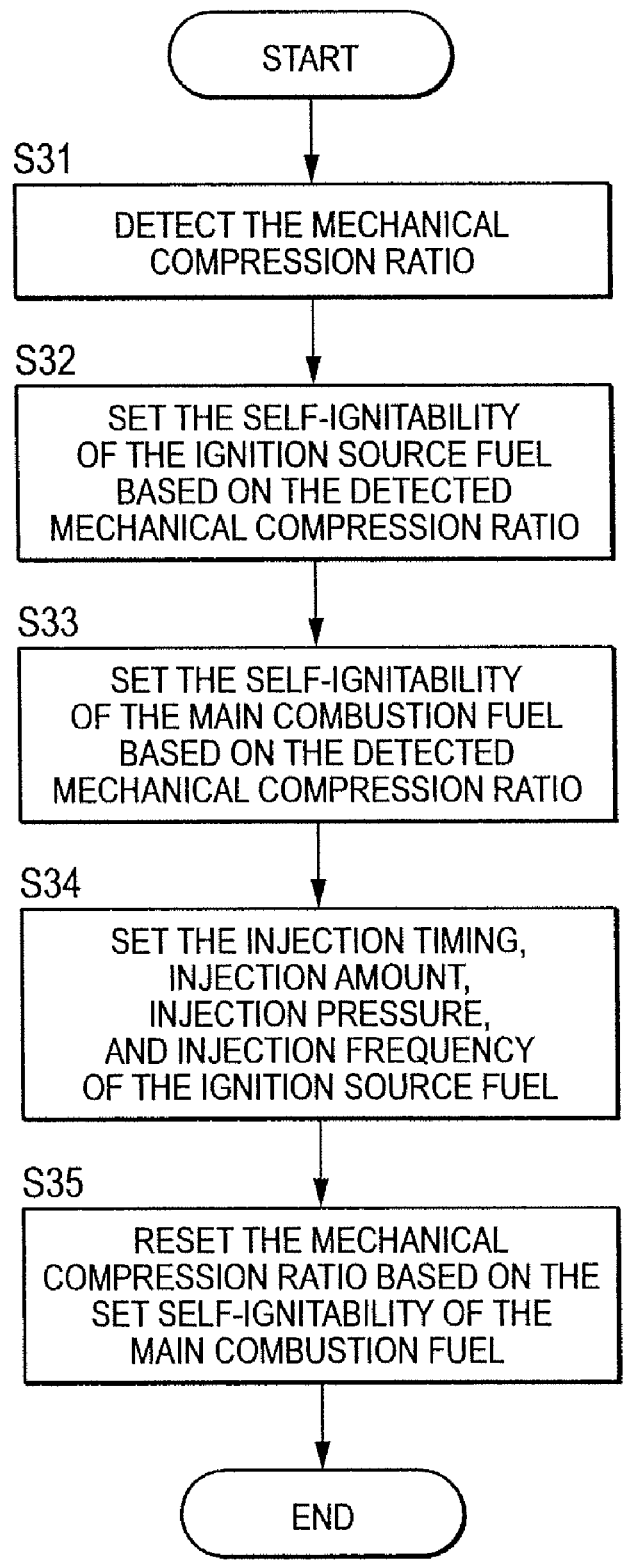
FIG. 17 is a flowchart showing a routine executed by the controller to detect the mechanical compression ratio, set the self-ignitability of the main compression fuel and the self-ignitability of the ignition source fuel in accordance with a resulting detection value, and then set the mechanical compression ratio.
Figure 18:
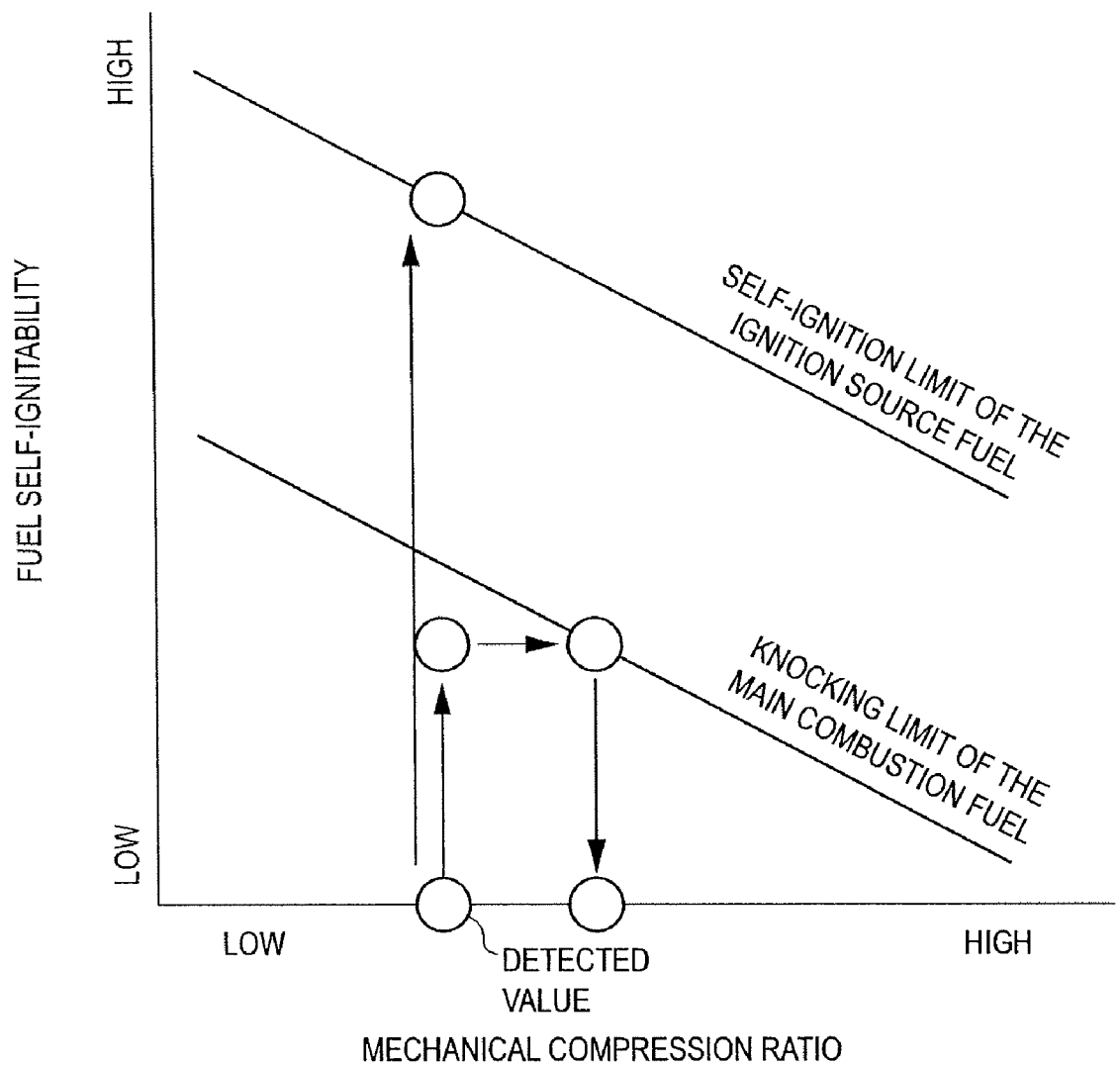
FIG. 18 is a diagram illustrating a process performed through execution of the routine in FIG. 17 by the controller to determine the self-ignitability of the ignition source and the self-ignitability of the main combustion fuel based on the mechanical compression ratio.

It should be noted that when the self-ignitability of the main combustion fuel can be set lower than the main combustion knocking limit, as shown in a step S35 of FIG. 17 and FIG. 18, the mechanical compression ratio is preferably raised to a limit at which knocking is not caused by the main combustion fuel at the self-ignitability of the main combustion fuel. In so doing, the engine output can be improved.

The contents of Tokugan 2007-203342 with a filing date of Aug. 3, 2007 in Japan are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, the controller may comprise plural microcomputers.

In the embodiments described above, the fuel tank 40 to which fuel is supplied from the outside is provided singly, but two fuel tanks, namely a main combustion fuel tank to which the main combustion fuel is supplied and an ignition source fuel tank to which the ignition source fuel is supplied, may be provided. Further, the first fuel reformer 112 may reform the fuel in the main combustion fuel tank and the second fuel reformer 122 may reform the fuel in the ignition source fuel tank. In so doing, fuel having an even more appropriate octane value can be obtained.

Further, more sophisticated control can be performed in the embodiments described above by additionally taking the intake air temperature into account. In the embodiments described above, a case in which the internal pressure of the cylinder in the vicinity of compression top dead center is adjusted according to the mechanical compression ratio was described, but the internal pressure of the cylinder in the vicinity of compression top dead center may be adjusted by adjusting a supercharging pressure using a supercharger. The internal pressure of the cylinder may also be adjusted by adjusting the internal temperature of the cylinder using a heater. These methods may be applied to a normal engine as well as a VCR engine.

In each of the above embodiments, the parameters required for control are detected using sensors, but this invention can be applied to any combustion control device which can perform the claimed control using the claimed parameters regardless of how the parameters are acquired.

The embodiments of this invention in which an exclusive property or privilege is claimed are defined as follows:

What is claimed is:

1. A combustion control device for an internal combustion engine which, during a compression stroke in which a premixed gas containing a fuel and air is compressed within a cylinder after being aspirated into the cylinder, injects a fuel having a higher self-ignitability than the fuel forming the premixed gas into the cylinder, and ignites the premixed gas using the injected fuel as an ignition source, comprising:
   means for detecting any one of the self-ignitability of the fuel forming the premixed gas, the self-ignitability of the fuel serving as the ignition source, and an internal cylinder pressure; and
   means for adjusting the other two in accordance with a resulting detection value.

2. A combustion control device for an internal combustion engine which, during a compression stroke in which a premixed gas containing a fuel and air is compressed within a cylinder after being aspirated into the cylinder, injects a fuel having a higher self-ignitability than the fuel forming the premixed gas into the cylinder, and ignites the premixed gas using the injected fuel as an ignition source, comprising a programmable controller programmed to:
   detect any one of a self-ignitability of the fuel forming the premixed gas, a self-ignitability of the fuel serving as the ignition source, and an internal cylinder pressure; and
   adjust the other two in accordance with a resulting detection value.

3. The combustion control device as defined in claim 2, wherein the internal cylinder pressure is a value when the ignition source fuel ignites in the vicinity of compression top dead center and is represented by a mechanical compression ratio of the internal combustion engine.

4. The combustion control device as defined in claim 2, wherein the internal cylinder pressure is a value when the ignition source fuel ignites in the vicinity of compression top dead center and is represented by an internal cylinder temperature.

5. The combustion control device as defined in claim 2, wherein the controller is further programmed to set the self-ignitability of the fuel forming the premixed gas, the self-ignitability of the fuel serving as the ignition source, and the internal cylinder pressure such that the self-ignitability of the fuel forming the premixed gas and the self-ignitability of the fuel serving as the ignition source decrease as the internal cylinder pressure approaches a state in which gas in the cylinder becomes more likely to ignite.

6. The combustion control device as defined in claim 2, wherein the controller is further programmed to:
   detect the self-ignitability of the fuel forming the premixed gas; and
   set the self-ignitability of the fuel serving as the ignition source and the internal cylinder pressure in accordance with a resulting detection value.

7. The combustion control device as defined in claim 6, wherein the controller is further programmed to:
   detect the self-ignitability of the fuel forming the premixed gas; and
   set the internal cylinder pressure such that the detected self-ignitability reaches a knocking limit.

8. The combustion control device as defined in claim 7, wherein the controller is further programmed to set the self-ignitability of the ignition source fuel such that the ignition source fuel self-ignites at the set internal cylinder pressure.

9. The combustion control device as defined in claim 2, wherein the controller is further programmed to:
   detect the self-ignitability of the fuel serving as the ignition source; and
   set the self-ignitability of the fuel forming the premixed gas and the internal cylinder pressure in accordance with a resulting detection value.

10. The combustion control device as defined in claim 9, wherein the controller is further programmed to:
    detect the self-ignitability of the fuel serving as the ignition source;
    set the internal cylinder pressure such that the detected self-ignitability constitutes a self-ignition lower limit; and
    set the self-ignitability of the fuel forming the premixed gas to be equal to or lower than a knocking limit at the set internal cylinder pressure.

11. The combustion control device as defined in claim 10, wherein the controller is further programmed to increase the internal cylinder pressure as long as the set self-ignitability of the fuel forming the premixed gas does not exceed the knocking limit.

12. The combustion control device as defined in claim 2, wherein the controller is further programmed to:
    detect the internal cylinder pressure; and
    set the self-ignitability of the fuel serving as the ignition source and the self-ignitability of the fuel forming the premixed gas in accordance with a resulting detection value.

13. The combustion control device as defined in claim 12, wherein the controller is further programmed to:
    detect the internal cylinder pressure; and
    set the self-ignitability of the ignition source fuel such that the ignition source fuel self-ignites at the detected internal cylinder pressure.

14. The combustion control device as defined in claim 12, wherein the controller is further programmed to:
    detect the internal cylinder pressure; and
    set the self-ignitability of the fuel forming the premixed gas to reach a knocking limit at the detected internal cylinder pressure.

15. The combustion control device as defined in claim 12, wherein the controller is further programmed to:
   detect the internal cylinder pressure;
   set the self-ignitability of the ignition source fuel such that the ignition source fuel self-ignites at the detected internal cylinder pressure;
   set the self-ignitability of the fuel forming the premixed gas to be lower than a knocking limit at the detected internal cylinder pressure; and
   increase the internal cylinder pressure as long as the set self-ignitability of the fuel forming the premixed gas does not exceed the knocking limit.

16. A combustion control method for an internal combustion engine which, during a compression stroke in which a premixed gas containing a fuel and air is compressed within a cylinder after being aspirated into the cylinder, injects a fuel having a higher self-ignitability than the fuel forming the premixed gas into the cylinder, and ignites the premixed gas using the injected fuel as an ignition source, comprising:
   detecting any one of the self-ignitability of the fuel forming the premixed gas, the self-ignitability of the fuel serving as the ignition source, and an internal cylinder pressure; and
   adjusting the other two in accordance with a resulting detection value.

\* \* \* \* \*